United States Patent
Obara et al.

(10) Patent No.: US 6,734,591 B2
(45) Date of Patent: May 11, 2004

(54) SPINDLE MOTOR

(75) Inventors: Rikuro Obara, Miyota-machi (JP); Hiroshi Yoshikawa, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 10/392,958

(22) Filed: Mar. 21, 2003

(65) Prior Publication Data

US 2003/0155826 A1 Aug. 21, 2003

Related U.S. Application Data

(62) Division of application No. 09/897,599, filed on Jul. 3, 2001, now Pat. No. 6,563,243.

(30) Foreign Application Priority Data

Jul. 11, 2000 (JP) ........................................ 2000-209895

(51) Int. Cl.[7] ................................................. H02K 7/08
(52) U.S. Cl. .................... 310/90; 310/67 R; 310/91; 384/537
(58) Field of Search ........................ 310/90, 91, 67 R; 384/537, 504; 360/98.07, 99.04

(56) References Cited

U.S. PATENT DOCUMENTS

| | | | |
|---|---|---|---|
| 5,002,406 A | 3/1991 | Morton et al. | 384/477 |
| 5,138,209 A | 8/1992 | Chuta et al. | 310/67 R |
| 5,435,654 A | 7/1995 | Ishida et al. | 384/488 |
| 5,463,861 A | 11/1995 | Lorenz | 57/339 |
| 5,596,235 A | 1/1997 | Yazaki et al. | 310/67 R |
| 5,683,183 A | 11/1997 | Tanaka et al. | 384/100 |
| 5,686,771 A | 11/1997 | Ishizuka et al. | 310/90 |
| 5,698,919 A | 12/1997 | Obara | 310/90 |
| 5,821,646 A | 10/1998 | Chuta et al. | 310/67 R |
| 5,932,941 A | 8/1999 | Kinoshita et al. | 310/44 |
| 5,933,292 A | 8/1999 | Obara | 360/99.08 |
| 6,068,407 A | 5/2000 | Kobayashi et al. | 384/488 |
| 6,097,121 A | 8/2000 | Oku | 310/91 |
| 6,129,454 A | 10/2000 | Obara | 384/510 |
| 6,149,382 A | 11/2000 | Englander et al. | 415/90 |
| 6,181,513 B1 | 1/2001 | Obara | 360/99.08 |
| 6,229,237 B1 | 5/2001 | Obara et al. | 310/90 |
| 6,246,137 B1 | 6/2001 | Obara | 310/90 |
| 6,513,984 B1 * | 2/2003 | Hobaugh, II | 384/537 |
| 6,563,243 B2 * | 5/2003 | Obara et al. | 310/90 |
| 2001/0022871 A1 * | 9/2001 | Buchheim et al. | 384/537 |
| 2001/0053255 A1 | 12/2001 | Obara | 384/480 |
| 2001/0054854 A1 | 12/2001 | Akahori | 310/90 |
| 2002/0008432 A1 | 1/2002 | Akahori | 310/90 |
| 2002/0047390 A1 | 4/2002 | Acki et al. | 310/90 |
| 2003/0002762 A1 * | 1/2003 | Kamura et al. | 384/537 |
| 2003/0012475 A1 * | 1/2003 | Vignotto et al. | 384/544 |

FOREIGN PATENT DOCUMENTS

| | | | | |
|---|---|---|---|---|
| JP | 2000074064 | 3/2000 | | H02K/21/22 |
| JP | 2000212706 | 7/2000 | | H02K/5/24 |
| JP | 2000220854 | 7/2000 | | H02K/5/173 |
| JP | 2002009895 | 7/2000 | | H02K/5/16 |
| JP | 2002027702 | 1/2002 | | H02K/5/16 |

* cited by examiner

*Primary Examiner*—Burton S. Mullins
*Assistant Examiner*—Heba Yousri M. El-kassabgi
(74) *Attorney, Agent, or Firm*—Israel Gopstein

(57) ABSTRACT

A spindle motor comprising a double row bearing device including a shaft, a sleeve surrounding the shaft, and a pair of upper and lower rows of balls, a cylindrical bearing holder extending upwardly from a base of the spindle motor for accommodating the sleeve within a vertical bore of the holder, and a rotor hub mounted on the shaft for journaling the rotor hub rotatably on the base, the spindle motor is characterized in that a reduced inner diameter portion of an inner diameter smaller than the outer diameter of the sleeve is formed on the inner surface of the bore of the bearing holder between the upper and lower larger inner diameter portions to urge the sleeve inwardly by the reduced inner diameter portion to deform it elastically to form a squeezed portion protruding inwardly of the sleeve between the upper and lower rows of balls.

11 Claims, 11 Drawing Sheets

US 6,734,591 B2

SPINDLE MOTOR

This application is a division of application Ser. No. 09/897,599, filed Jul. 3, 2001 now U.S. Pat. No. 6,563,243.

BACKGROUND OF THE INVENTION

1. Technical Field

The present invention relates to a spindle motor preferable as a rotational driving device for office automation equipments like computers and peripheral devices for computers.

2. Description of the Prior Art

As shown in FIG. 11, the spindle motor used for driving magnetic disc or discs of a hard disc drive device or peripheral devices for computers includes a bearing device 43 accommodated within a cylindrical bearing holder 42 extending upwardly from a base 41, a shaft 44 to which a rotor hub 45 is secured. The bearing device 43 includes a pair of upper and lower ball bearings 46, 47. These bearings include inner rings 46a, 47a attached to the shaft 44, and outer rings 46b, 47b fit within a sleeve 48. The sleeve 48 is fit and secured to the bearing holder 42. An appropriate pre-load is applied on the inner ring 47a of the lower ball bearing 47 from below. The inner ring 47a is fixedly secured to the shaft 44 under the condition that the balls 49a, 49b are kept in contact with the inner and outer rings with reasonable pressure.

The reference numeral 50 indicates a spacer interposed between the upper and lower outer rings 46b, 47b.

Upon rising the temperature through the operation of the motor, the components of the motor expand into different dimensions. In the case of the ball bearings 46, 47, the order of the amount of expansion in the diametrical direction is;

the outer ring>the inner ring>balls.

In other words, the spacing between inner and outer rings increased upon rising the temperature of the motor is larger than the amount of expansion of the balls so that the pressure applied by the inner and outer rings on the balls i.e. the pre-load is reduced. This causes the natural frequency upon rotating of the motor to vary, and in some cases the resonance with the other components of the equipment in which the motor is incorporated.

When the spindle motor of the prior art of the above described structure is used as a drive means for the hard disc drive device, sometimes the accuracy of writing or reading out the data is deteriorated by the vibration of the drive device caused by the resonance with the other component such as a swing arm or a casing. There is also a possibility for generating noises caused by the vibration, and reducing the quietness of the drive device.

Provided that the difference of the amount of the expansion of the inner and outer rings is increased further, a clearance is defined between the balls and the inner and outer rings, and the rotational run out of the rotor hub and the run out of the surface of the magnetic disc or discs are generated. This will deteriorate the reliability of the hard disc drive device.

Although the balls are usually formed of steel material, ceramic material may also be used for enhancing the durability thereof. In such a case, the above mentioned problem caused by the difference of the amount of thermal expansion between components will become more serious, since the amount of thermal expansion of the ceramic material is further lower than that of the steel material.

Accordingly the object of the present invention is to provide a spindle motor wherein the inner and outer rings are in constant contact with the balls by applying appropriate pre-load thereto even if the components of the motor expand by rising the temperature of the motor. The purpose of the present invention is to provide a spindle motor of high rotational accuracy wherein the variation of the resonant frequency or the rotational run out caused by the variation of the temperature are reduced.

SUMMARY OF THE INVENTION

In order to achieve the purpose of the present invention, a spindle motor in accordance with the first aspect of the present invention comprises;

a double row bearing device including a shaft, a sleeve surrounding the shaft, and a pair of upper and lower rows of balls, a cylindrical bearing holder extending upwardly from a base of the spindle motor for accommodating the sleeve within a vertical bore of the holder, and a rotor hub mounted on the shaft for journaling the rotor hub rotatably on the base, the spindle motor is characterized in that a reduced inner diameter portion of an inner diameter smaller than the outer diameter of the sleeve is formed on the inner surface of the bore of the bearing holder between the upper and lower larger inner diameter portions to urge the sleeve inwardly by the reduced inner diameter portion to deform it elastically to form a squeezed portion protruding inwardly of the sleeve between the upper and lower rows of balls.

A spindle motor in accordance with the second aspect of the present invention comprises;

a double row bearing device including a shaft, a sleeve surrounding the shaft, and a pair of upper and lower rows of ball bearings interposed between the shaft and the sleeve, each ball bearing has an inner ring and an outer ring and balls interposed therebetween, a cylindrical bearing holder extending upwardly from a base of the spindle motor for accommodating the sleeve of the double row bearing device within a vertical bore of the holder, and a rotor hub mounted on the shaft for journaling the rotor hub rotatably on the base, the spindle motor is characterized in that a reduced inner diameter portion of an inner diameter smaller than the outer diameter of the sleeve is formed on the inner surface of the bore of the bearing holder between the upper and lower larger inner diameter portions to urge the sleeve inwardly by the reduced inner diameter portion to deform it elastically to form a squeezed portion protruding inwardly of the sleeve between the upper and lower outer rings.

A spindle motor in accordance with the third aspect of the present invention comprises;

a stepped shaft having a larger diameter shaft portion and a reduced diameter shaft portion, a compound bearing device including;

a sleeve surrounding the stepped shaft and including a pair of upper and lower parallel outer raceways or grooves, balls of the upper row disposed between an inner raceway or groove formed directly on the outer periphery of the larger diameter shaft portion of the stepped shaft and the upper row of outer raceway formed on the inner peripheral surface of the sleeve, and balls of the lower row disposed between an inner raceway formed on an inner ring fit around the reduced diameter shaft portion of the stepped shaft and the lower row of outer raceway formed on the inner peripheral surface of the sleeve, a cylindrical bearing holder extending upwardly from a base of the spindle motor for accommodating the sleeve of the compound bearing device within a vertical bore of the holder, and a rotor hub mounted on the larger diameter shaft portion of the shaft for journaling the rotor hub rotatably on the base, the spindle motor is characterized in that a reduced inner diameter portion of an inner diameter smaller than the outer diameter of the sleeve is formed on the inner surface of the bore of the bearing holder between the upper and lower larger inner diameter portions to urge the sleeve inwardly by the reduced inner diameter portion to deform it elastically to form a squeezed portion protruding inwardly of the sleeve between the upper and lower outer raceways.

A spindle motor in accordance with the fourth aspect of the present invention comprises;

a spindle motor comprising a double row bearing device including a shaft, a sleeve surrounding the shaft, and a pair of upper and lower rows of balls, a cylindrical bearing holder extending upwardly from a base of the spindle motor for accommodating the sleeve within a vertical bore of the holder, and a rotor hub mounted on the shaft for journaling the rotor hub rotatably on the base, the spindle motor is characterized in that an outer peripheral groove formed on the sleeve, and a squeezing ring having an inner diameter smaller than the outer diameter of the outer peripheral groove, wherein the squeezing ring is fit over the outer peripheral groove to elastically deform the sleeve inwardly to form a squeezed portion protruding inwardly between the upper and lower row of balls.

A spindle motor in accordance with the fifth aspect of the present invention comprises;

a spindle motor comprising a double row bearing device including a shaft, a sleeve surrounding the shaft, and a pair of upper and lower rows of ball bearings interposed between the shaft and the sleeve, each ball bearing has an inner ring and outer ring and balls interposed therebetween, a cylindrical bearing holder extending upwardly from a base of the spindle motor for accommodating the sleeve of the double row bearing device within a vertical bore of the holder, and a rotor hub mounted on the shaft for journaling the rotor hub rotatably on the base, the spindle motor is characterized in that an outer peripheral groove formed on the sleeve, and a squeezing ring having an inner diameter smaller than the outer diameter of the outer peripheral groove, wherein the squeezing ring is fit over the outer peripheral groove to elastically deform the sleeve inwardly to form a squeezed portion protruding inwardly between the upper and lower row of outer rings.

A spindle motor in accordance with the sixth aspect of the present invention comprises;

a spindle motor comprising a stepped shaft including a larger diameter shaft portion and a reduced diameter shaft portion, a compound bearing device including, a sleeve surrounding the stepped shaft and including a pair of upper and lower parallel outer raceways or grooves, balls of the upper row disposed between an inner raceway or groove formed directly on the outer periphery of the larger diameter shaft portion of the stepped shaft and the upper row of outer raceway formed on the inner peripheral surface of the sleeve, and balls of the lower row disposed between an inner raceway formed on an inner ring fit around the reduced diameter shaft portion of the stepped shaft and the lower row of outer raceway formed on the inner peripheral surface of the sleeve, a cylindrical bearing holder extending upwardly from a base of the spindle motor for accommodating the sleeve of the compound bearing device within a vertical bore of the holder, and a rotor hub mounted on the larger diameter shaft portion of the shaft for journaling the rotor hub rotatably on the base, the spindle motor is characterized in that an outer peripheral groove formed on the sleeve, and a squeezing ring having an inner diameter smaller than the outer diameter of the outer peripheral groove, wherein the squeezing ring is fit over the outer peripheral groove to elastically deform the sleeve inwardly to form a squeezed portion protruding inwardly between the upper and lower row of outer raceways.

A spindle motor in accordance with the seventh aspect of the present invention comprises;

the above described spindle motor of the second or fifth aspect wherein peripheral grooves of substantially the same width as that of the outer raceway formed on the inner peripheral surface of the outer ring are formed at positions of the inner peripheral surface of the sleeve against which the outer ring of each ball bearing abut.

A spindle motor in accordance with the eighth aspect of the present invention comprises;

one of any spindle motors of the first to sixth aspect wherein the shaft and the rotor hub are formed integrally with each other by employing the same material.

A spindle motor in accordance with the ninth aspect of the present invention comprises;

one of any spindle motors of the first to sixth aspect wherein the balls are formed of ceramic material.

A spindle motor in accordance with the tenth aspect of the present invention comprises;

the third or sixth spindle motor wherein the outer diameter of the inner ring is identical with that of the larger diameter shaft portion of the stepped shaft, and the balls of the upper row are identical in their d with that of the balls of the lower row.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

A preferred embodiment of a spindle motor in accordance with the present invention will now be described in detail with reference to the concrete example illustrated in the attached drawings.

<The First Embodiment>

Figure 1:
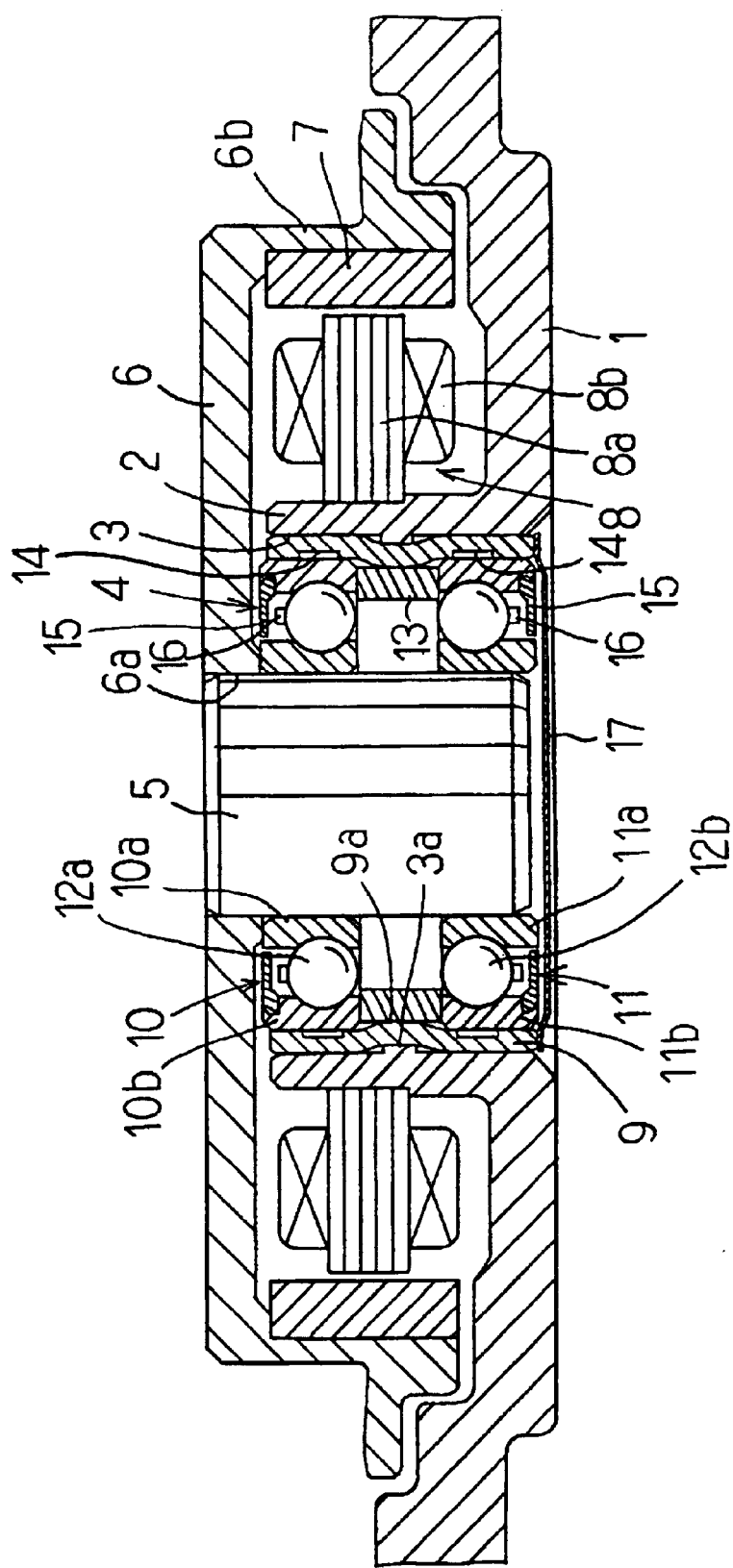
FIG. 1 is a vertical sectional view showing the spindle motor in accordance with the first embodiment of the present invention.
Figure 2:
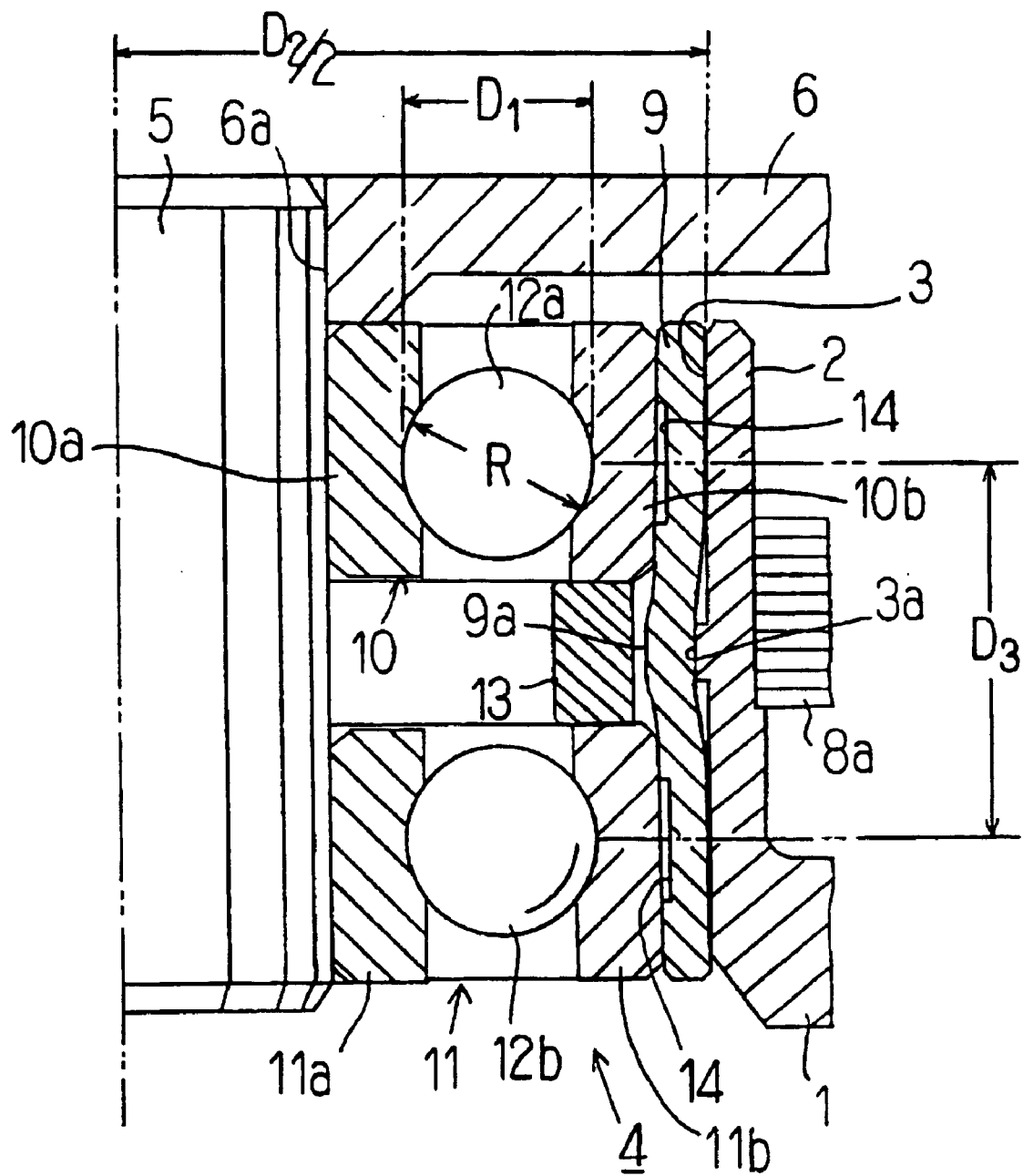
FIG. 2 is an enlarged vertical sectional view showing the substantial part of FIG. 1.

A spindle motor in accordance with the first embodiment of the present invention includes a cylindrical bearing holder 2 formed integrally with a base 1, a bearing device 4 accommodated within a bore 3 extending through the holder, and a shaft 5 fit and bonded at its top end into a central aperture 6a of a rotational member or a rotor hub 6 and journalled rotatably through the bearing device 4 as shown in FIGS. 1 and 2.

The rotor hub 6 has a magnet or magnets 7 mounted on the inner peripheral surface of a flange 6b depending downwardly from the outer periphery of the hub. The inner peripheral surface of the magnet or magnets 7 are faced opposite to the outer peripheral surface of a stator 8 mounted on the outer periphery of the bearing holder 2.

The bearing device 4 includes a sleeve 9 and upper and lower ball bearings 10, 11 accommodated within the sleeve. These bearings include inner rings 10a, 11a, outer rings 10b, 11b, balls 12a, 12b of ceramic material interposed between the inner and outer rings, and a spacer 13 interposed between bearings.

The sleeve may be made of stainless steel, ceramic material, or synthetic resin. The inner and outer rings of the ball bearings may be made for example of bearing steel.

The central bore 3 of the bearing holder 2 has on its inner peripheral surface upper and lower larger inner diameter portions and a reduced thicker inner diameter portion 3a disposed between the larger diameter portions. The inner diameter of the upper and lower larger inner diameter portions is substantially identical with or larger than the outer diameter of the sleeve 9.

The inner diameter of the reduced inner diameter portion 3a is smaller than the outer diameter of the sleeve 9, so that the sleeve is adapted to be urged by the reduced inner diameter portion 3a inwardly toward the center thereof to form a squeezed portion 9a protruding inwardly on the inner surface of the sleeve between the outer rings 10b, 11b of the upper and lower ball bearings 10, 11 by the elastic deformation of the sleeve.

The sleeve 9 has a shape of straight cylindrical configuration before assembling within the bearing holder 2. Upon assembled within the bearing holder 2, the sleeve is deformed by the reduced inner diameter portion 3a of the bearing holder 2 to form the squeezed portion 9a, and the upper and lower portions of the sleeve 9 from the squeezed portion 9a is drawn toward the squeezed portion 9a to shorten the axial length of the sleeve 9.

The inner diameter of the reduced inner diameter portion 3a is determined on the basis of the materials employed for the sleeve 9 and the bearing holder 2 and the threshold values of the increased temperature. The amount of the deformation of the squeezed portion 9a should be within the elastic limit of the material of the sleeve.

A pair of parallel upper and lower inner peripheral grooves 14, 14 are formed on the inner peripheral surface of the sleeve 9 at the positions to abut with the outer rings 10b, 11b of the upper and lower ball bearings. The width of each groove is substantially identical with that of the outer raceway of each outer ring.

In FIG. 1, an iron core of the stator is designated by the reference numeral 8a, energizing coils of the stator is designated by the reference numeral 8b, a sealing plate of the ball bearing is designated by the reference numeral 15, a ball retainer is designated by the reference numeral 16, and a cover of the bearing device is designated by the reference numeral 17.

In the spindle motor of the above described arrangement, the inner ring 10a of the ball bearing 10 is secured onto the shaft before assembling the bearing device 4 within the bore 3 of the bearing holder 2, whereas the inner ring 11a of the lower ball bearing 11 is not secured so as to be slidably thereon. After inserting the sleeve 9 into the bearing holder or after mounting the rotor hub 6 on the shaft 5, an appropriate pre-load is applied to the inner ring 11a of the lower ball bearing 11 and the inner ring 11a is secured on the shaft by any means such as adhesive.

The operation of the spindle motor arranged as set force above will now be described.

The rotor hub 6 is adapted to be drove rotationally around the shaft while the electric power for driving the motor is supplied to the coils 8b of the stator 8.

Upon rising the temperature of the spindle motor through the operation thereof, all of each component of the motor will expand thermally. In the case of the ball bearings 10, 11, the amount of expansion of the inner diameter of the outer rings 10b, 11b is larger than that of the outer diameter of the inner rings 10a, 11a so that the distance $D_1$ between the outer raceway of the outer ring and the inner raceway of the inner ring of each ball bearing is enlarged. The amount of expansion of the diameter R of the balls 12a, 12b is smaller than that of the inner and outer rings. Thus, the load applied to the balls through the contact with the rings is reduced. In other words, the components are deformed to reduce the pre-load.

On the other hand, the amount of expansion of the inner diameter $D_2$ of the bore 3 of the bearing holder 2 is larger than that of the outer diameter of the sleeve 9. This means that while the temperature rises, the urging pressure applied by the reduced inner diameter portion 3a of the bearing holder 2 against the sleeve 9 is reduced, and the sleeve is tend to recover the original straight cylindrical shape thereof by the elastic property of the sleeve. Thus the amount of protrusion of the squeezed portion 9a is also reduced. Further, the sleeve extends axially by the expansion thereof in the axial direction. Consequently, the axial spacing between the outer rings 10b, 11b of the ball bearing is enlarged and the spacing $D_3$ between the outer raceways of the outer rings is also enlarged. In other words, the sleeve will deform to increase the load applied by the inner and outer rings to the ball, or to increase pre-load to be applied to the balls.

The reduction of the pre-load to be applied to the balls due to the augmentation of the distance $D_1$ between the outer raceway of the outer ring and the inner raceway of the inner ring of each ball bearing will be cancelled by the augmentation of the pre-loading pressure to be applied to the balls due to the augmentation of the axial distance $D_3$ between the outer raceways of the upper and lower outer rings. In this connection, the pre-load to be applied to the balls can be kept in an appropriate value.

The outer raceways of the outer rings 10b, 11b are protected from the over pressure generated upon urged the sleeve inwardly by the reduced inner diameter portion 3a of the bearing holder 2, since the inner peripheral grooves 14, 14 are formed on the inner peripheral surface of the sleeve 9. Further the deformation of the outer raceways due to the pressurization can also be inhibited.

Consequently, the outer rings are adapted to contact constantly with the balls with an appropriate loading force, and the non-repeatable run out (NRRO) due to the deformation of the outer raceways of the outer rings can also be avoided.

<The Second Embodiment>

Figure 3:
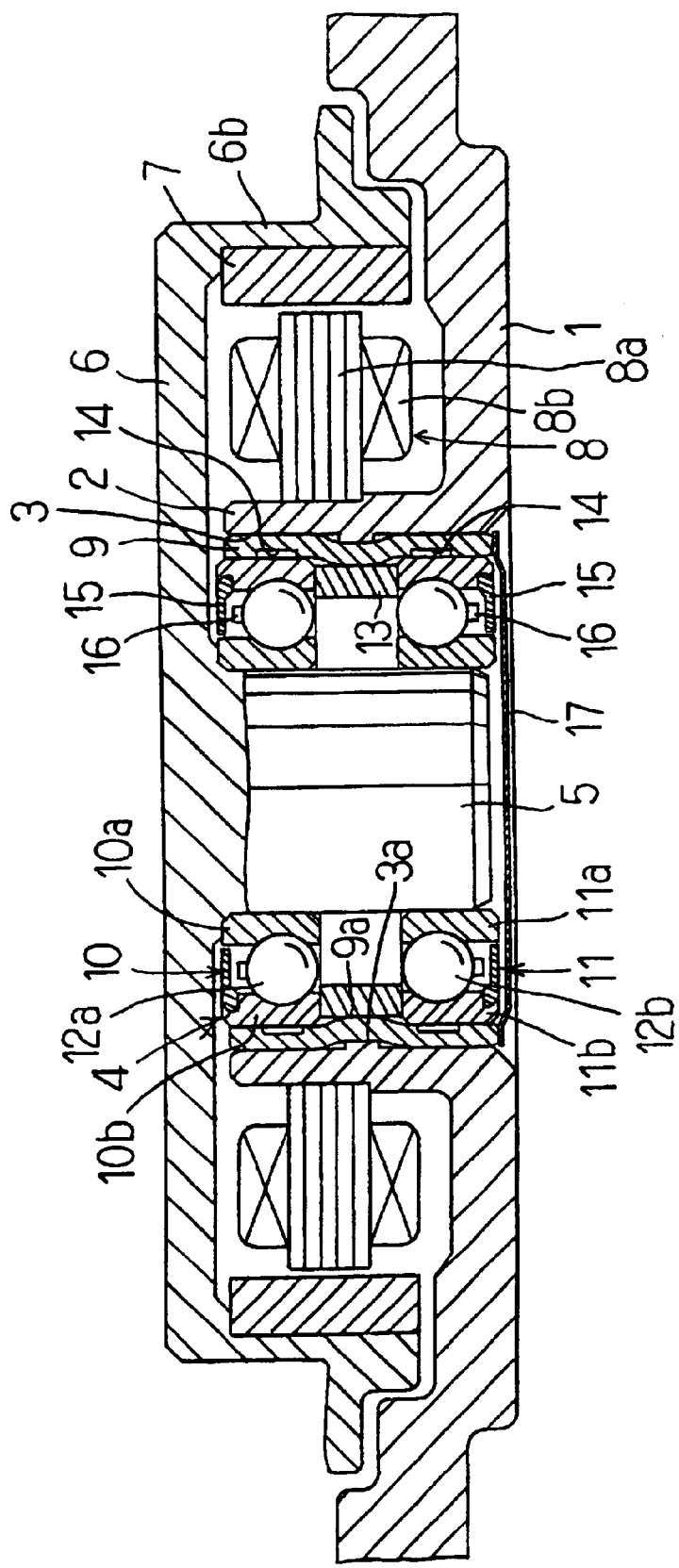
FIG. 3 is a vertical sectional view showing the spindle motor in accordance with the second embodiment of the present invention.

In the above mentioned first embodiment, the shaft 5 and the rotor hub 6 are formed as separate members. However, these members can be formed integrally with each other by using the same material as in the second embodiment as shown in FIG. 3.

In the spindle motor of the second embodiment, the following advantages can be obtained; the number of parts is reduced, the operation for assembling the shaft 5 with the rotor hub 6 is not necessary on assembling the spindle motor, the adjustment process to be made during the assembling operation of the shaft with the rotor hub such as the centering process of the shaft is no longer required, and the number of steps required on assembling the motor can also be reduced.

The other structures or arrangements of the spindle motor of the second embodiment are identical with those of the first embodiment.

<The Third Embodiment>

Figure 4:
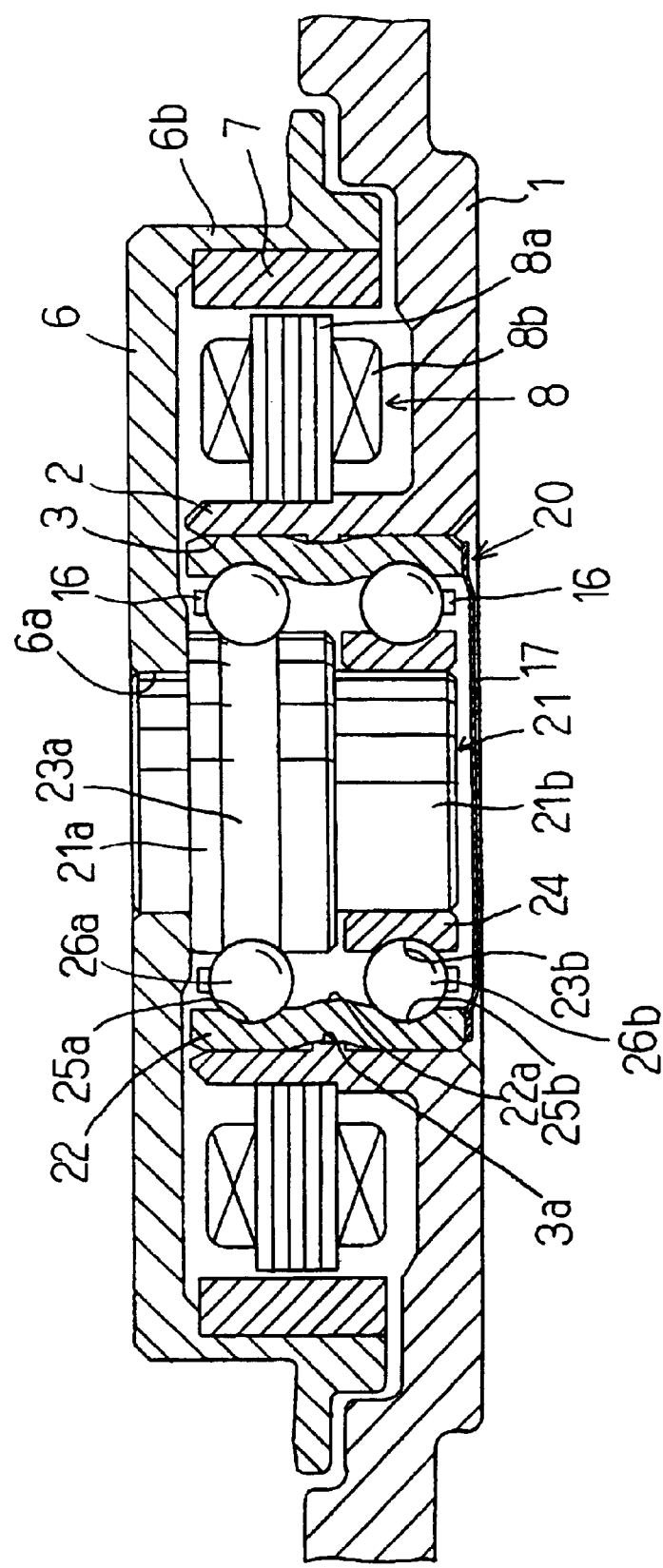
FIG. 4 is a vertical sectional view showing the spindle motor in accordance with the third embodiment of the present invention.

The spindle motor of the third embodiment shown in FIG. 4 includes a compound bearing device 20 of a unique structure served as the bearing device for journaling the rotor hub 6. The concrete structure of the or bearing device will now be described as follows.

In FIG. 4, the reference numeral 21 indicates a stepped shaft having a larger diameter shaft portion 21a and a reduced diameter shaft portion 21b, and the reference numeral 22 indicates a sleeve surrounding the stepped shaft.

The stepped shaft has on its outer periphery of the larger diameter shaft portion 21a an inner raceway 23a for the upper row formed directly thereon. An inner ring 24 including an inner raceway 23b for the lower row is fit around the reduced diameter shaft portion 21b.

The sleeve 22 has on its inner peripheral surface a pair of parallel outer raceways 25a, 25b formed directly thereon. The sleeve 22 is adapted to serve as an outer ring in common with both upper and lower outer rows. Balls 26a for the upper row are interposed between the outer raceway 25a of the upper row and the inner raceway 23a formed on the larger diameter shaft portion 21a of the stepped shaft. Balls 26b for the lower row are interposed between the outer raceway 25b of the lower row of the sleeve 22 and the inner raceway 23b formed around the inner ring.

The balls 26a, 26b are formed for example of ceramic material and has the same diameter. This is because the outer diameter of the inner ring 24 is made substantially the same as that of the larger diameter shaft portion 21a of the stepped shaft.

In the spindle motor of this third embodiment, the compound bearing device of the structure as mentioned above is employed so that the generic bearing device including the inner and outer rings is no longer necessary. Further, the sleeve 22 is served as an outer ring in common with both upper and lower bearing device so that the number of parts can be reduced, the radial dimension of the larger diameter shaft portion 21a can be enlarged by the sum of the thicknesses of the inner and outer rings of the ball bearing, and the diameter of the reduced diameter shaft portion 21b can also be enlarged by the thickness of the outer ring of the ball bearing, i.e. the generally thick shaft can be obtained.

Accordingly, the shaft 21 of higher rigidity, good at durability, inhibited in its rotational run out, and good at quietness can be obtained.

The other structures or arrangements of the spindle motor of the third embodiment are identical with those of the first embodiment.

Upon assembling the spindle motor of this third embodiment, the inner ring 24 is fit slidably around the reduced diameter shaft portion 21b of the stepped shaft 21 to form a shaft-inner ring assembly, the sleeve 22 and the balls 26a, 26b of the pair of rows are assembled with the shaft-inner ring assembly, and the sleeve 22 is inserted into the through bore 3 of the bearing holder 2 so as to abut the portion 3a of the bore against the substantially axially central portion of the outer periphery of the sleeve 22.

The sleeve is deformed at its substantially central portion between the upper and lower outer raceways 25a, 25b by the reduced inner diameter portion 3a of the bearing sleeve 2 to form a squeezed portion 22a protruding inwardly toward the center of the sleeve. The upper and lower portions of the sleeve 9 from the squeezed portion 22a is drawn toward the squeezed portion to shorten the axial length thereof, and the distance between the outer raceways 25a, 25b is reduced.

The inner diameter of the reduced inner diameter portion 3a is determined on the basis of the materials employed for the sleeve 22 and the bearing holder 2 and the threshold values of the increased temperature. The amount of the deformation of the squeezed portion 22a should be within the elastic limit of the material of the sleeve.

Subsequently, the inner ring 24 is secured on the reduced diameter shaft portion 21b by any means such as adhesive with applying an appropriate pre-load to the inner ring 24 from the lower end surface thereof.

Even for the spindle motor of this third embodiment, the temperature risen through the operation of the spindle motor will expand each component of the motor. The amount of expansion of the inner diameter of the sleeve 22 is larger than that of the outer diameter of the stepped shaft 21 and the inner ring 24, and the amount of expansion of the balls 26a, 26b is smaller than that of the stepped shaft and the inner ring, so that the distance between the stepped shaft as well as the inner ring and the sleeve is enlarged and the pre-load to be applied to the balls is reduced.

On the other hand, the amount of expansion of the inner diameter of the bore 3 of the bearing holder 2 is larger than that of the outer diameter of the sleeve 22. This means that the urging pressure applied by the reduced inner diameter portion 3a against the sleeve 22 will be reduced, and the sleeve is tend to recover the original straight cylindrical shape thereof by the elastic property of the sleeve. Further, the sleeve extends axially by the expansion thereof in the axial direction. Consequently, the axial spacing between the outer raceways 25b, 25b of the sleeve 22 is enlarged, and the distance between the opposed inner and outer raceways of each row is reduced. In other words, the sleeve will be deformed to increase the pre-load applied to the ball.

The reduction of the pre-load to be applied to the balls due to the augmentation of the distance between the stepped shaft or the inner ring and the sleeve will be cancelled by the augmentation of the pre-load to be applied to the balls due to the augmentation of the distance between the outer raceways. In this connection, the pre-load to be applied to the balls can be kept in an appropriate value even in the event of increasing the temperature.

<The Fourth Embodiment>

Figure 5:
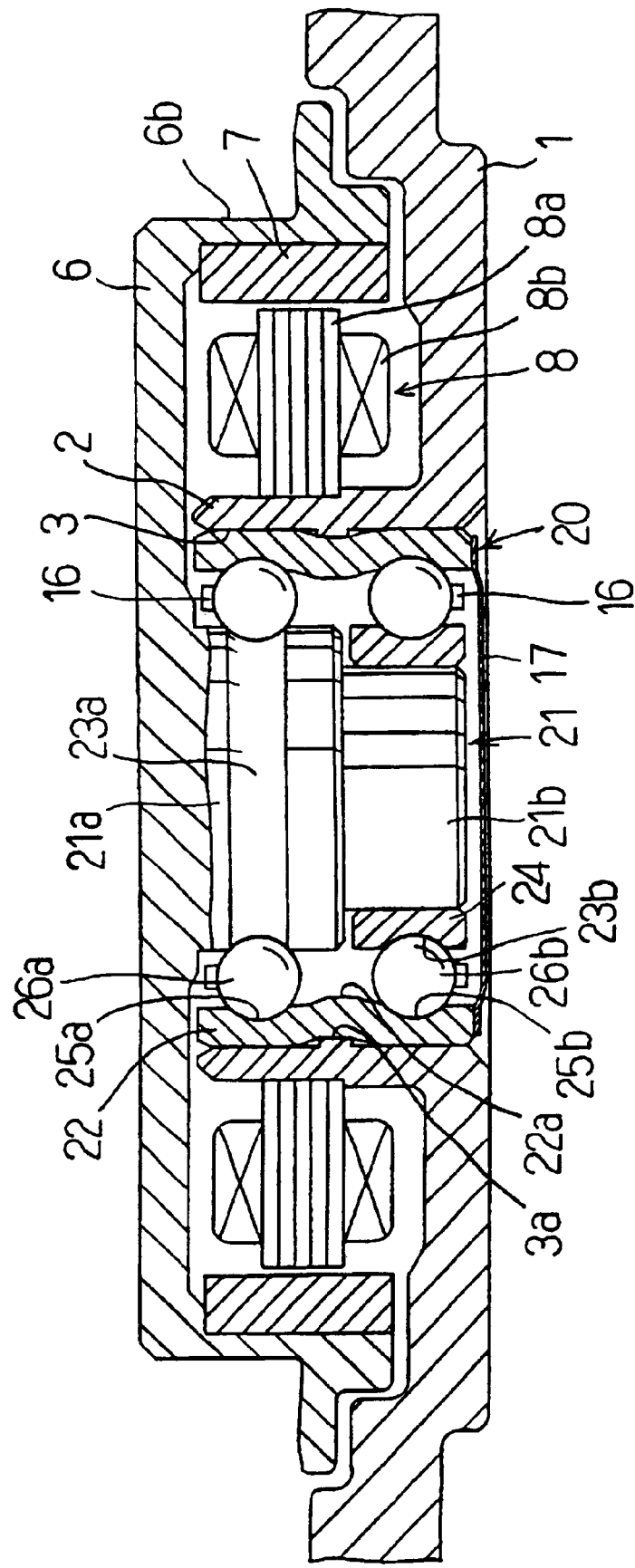
FIG. 5 is a vertical sectional view showing the spindle motor in accordance with the fourth embodiment of the present invention.

Although in the case of the spindle motor of the third embodiment, the stepped shaft 21 and the rotor hub 6 are formed as separate members, these members may be formed integrally with each other by the same material as in the fourth embodiment as shown in FIG. 5.

In this fourth embodiment, the number of parts can be reduced in the same manner as in the second embodiment. Further, it is not necessary to assemble the shaft 21 with the rotor hub 6 during the assembling operation of the spindle motor. In this connection, the adjustment process to be made during assembling the shaft with the rotor hub such as the centering process of the shaft is no longer required, and the number of steps required on assembling the motor can also be reduced.

The other structure or arrangement of the spindle motor of this fourth embodiment is identical with those of the third embodiment.

In the spindle motor in accordance with the above described first to fourth embodiments, the sleeves 9, 22 are adapted to be urged inwardly by the reduced inner diameter portion 3a formed within the bore of the bearing holder 2. Another structure of the spindle motor including a cylindrical bearing holder 2 with no reduced inner diameter portion on the inner surface of the bore and having the straight bore without any steps and a squeezing ring 27 to be applied directly to the sleeve for deforming the sleeve can be devised. The squeezing ring 27 will be described. The concrete examples of such arrangement will now be described in the following fifth to eighth embodiments.

<The Fifth Embodiment>

Figure 6:
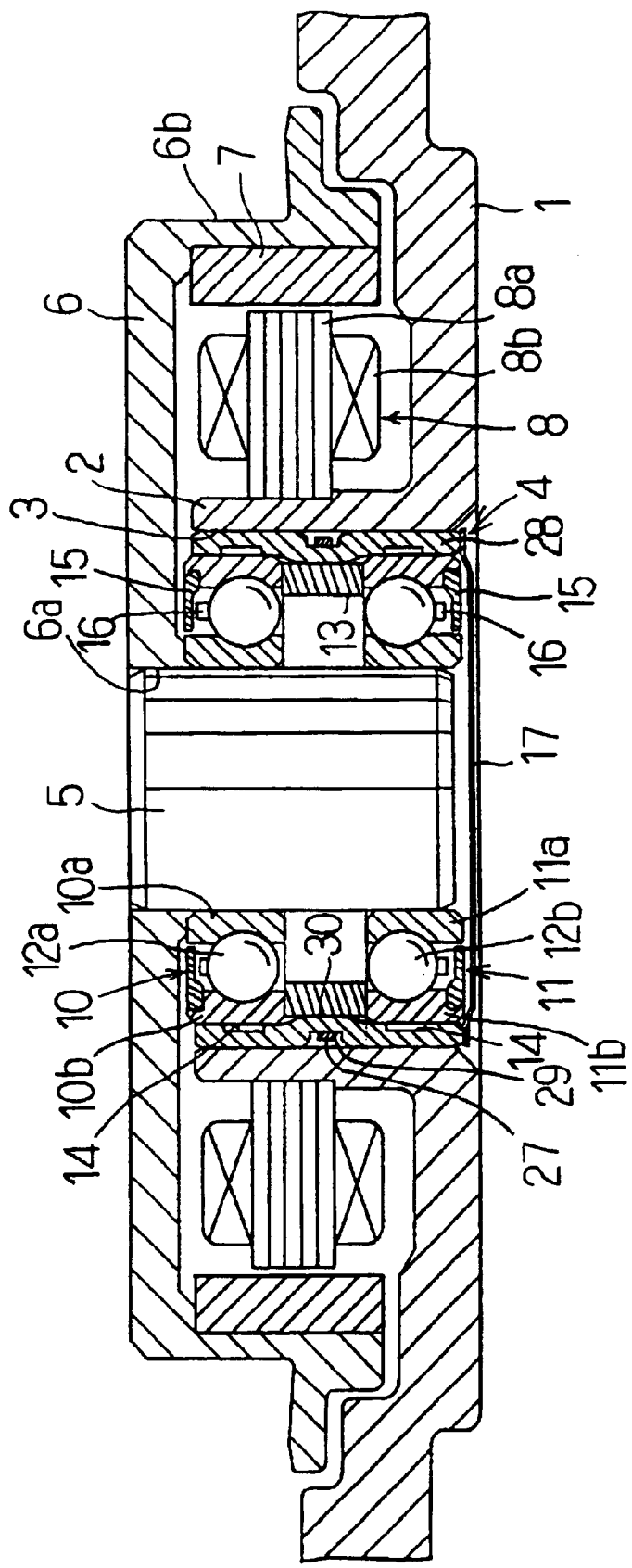
FIG. 6 is a vertical sectional view showing the spindle motor in accordance with the fifth embodiment of the present invention.

In the spindle motor in accordance with the fifth embodiment as shown in FIG. 6, a sleeve 28 has an outer peripheral groove 29 formed on its outer peripheral surface. A squeezing ring 27 made for example of ceramic material is adapted to be press fit within the outer peripheral groove 29.

The outer peripheral groove 29 is formed around the substantially axially central portion between the upper and lower outer rings 10b, 11b fit within the sleeve. The depth of the groove is set to make the outer diameter of the squeezing ring 27 smaller than that of the sleeve.

Figure 7:
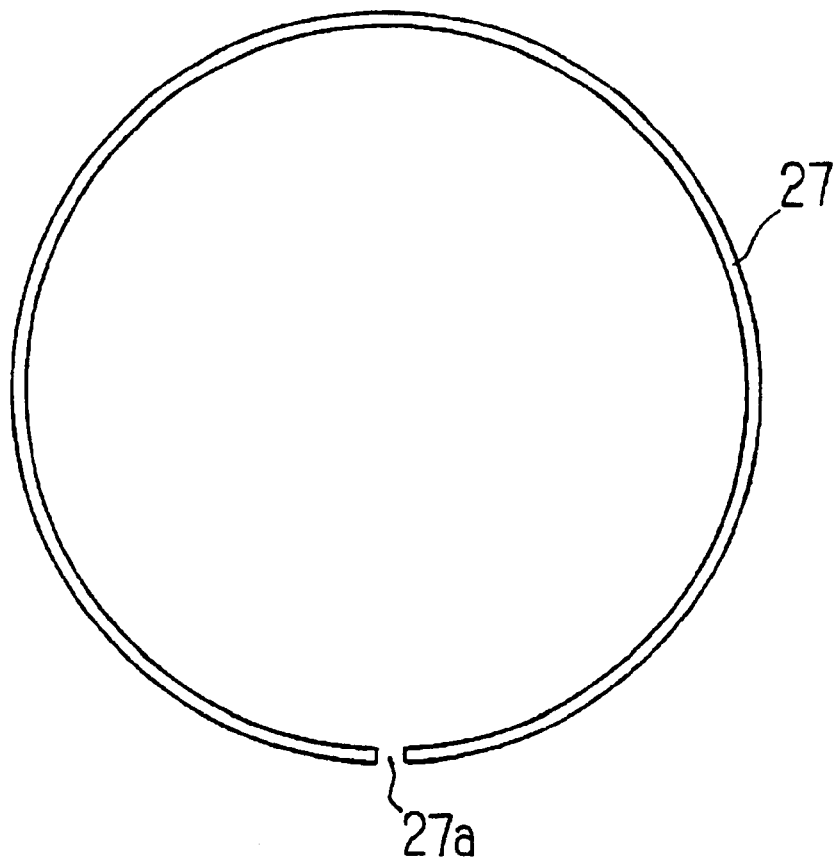
FIG. 7 is a plan view showing the squeezing ring.

The press fit of the squeezing ring 27 within the outer peripheral groove 29 of the sleeve can be effected by making the inner diameter of the squeezing ring smaller than the outer diameter of the outer peripheral groove of the sleeve. The assembling operation can be facilitated by using a C-ring having a cut 27a as shown in FIG. 7 as the squeezing ring.

The sleeve 28 exhibits a straight cylindrical configuration before press fitting the squeezing ring 27. Whereas after the squeezing ring is fit into the groove, an inwardly protruding squeezed portion 30 is formed on the inner surface of the sleeve between the outer rings 10b, 11b of the ball bearings, and upper and lower portions of the sleeve are drawn toward the squeezed portion 30 and thus the axial length of the sleeve 28 is reduced.

The inner diameter of the squeezing ring 27 is determined on the basis of the materials employed for the sleeve 28 and the bearing holder 2 and the threshold values of the increased temperature. The amount of the deformation of the squeezed portion 30 should be within the elastic limit of the material of the sleeve.

Another arrangements of the spindle motor of this embodiment are the same as those of the first embodiment.

Upon increased the temperature due to the driving of the spindle motor, all of each component of the motor will expand thermally. In the case of the ball bearings 10, 11, the amount of expansion of the inner diameter of the outer rings 10b, 11b is larger than that of the outer diameter of the inner rings 10a, 11a so that the distance between the raceways of the inner and outer rings of each ball bearing is enlarged. The amount of expansion of the diameter R of the balls 12a, 12b is smaller than those of the inner and outer rings. Thus, the load applied to the balls through the contact with the rings is reduced. In other words, the components are deformed to reduce the pre-load.

On the other hand, the amount of expansion of the inner diameter of the bore of the squeezing ring 27 is also increased in accordance with the rising of the temperature. This means that while the temperature is increased, the urging pressure applied by the squeezing ring 27 against the sleeve 28 is reduced, and the sleeve is tend to recover the original straight cylindrical shape thereof by the elastic property of the sleeve. Thus the amount of protrusion of the squeezed portion 30 is reduced. Further, the sleeve extends axially by the expansion thereof in the axial direction. Consequently, the axial spacing between the outer rings 10b, 11b of the ball bearing is enlarged to make larger the spacing between the outer raceways of the outer rings. In other words, the sleeve is deformed to increase the load applied to the ball by the inner and outer rings, or to increase pre-load to be applied to the balls.

Consequently, the reduction of the pre-load applied to balls due to the enlargement of the spacing between the raceways of the inner and outer rings is cancelled by the augmentation of the pre-load applied to balls due to the enlargement of the spacing between the outer raceways of upper and lower outer rings. Thus an appropriate pre-load will be maintained to be applied to balls even if the temperature of the components is increased.

<The Sixth Embodiment>

Figure 8:
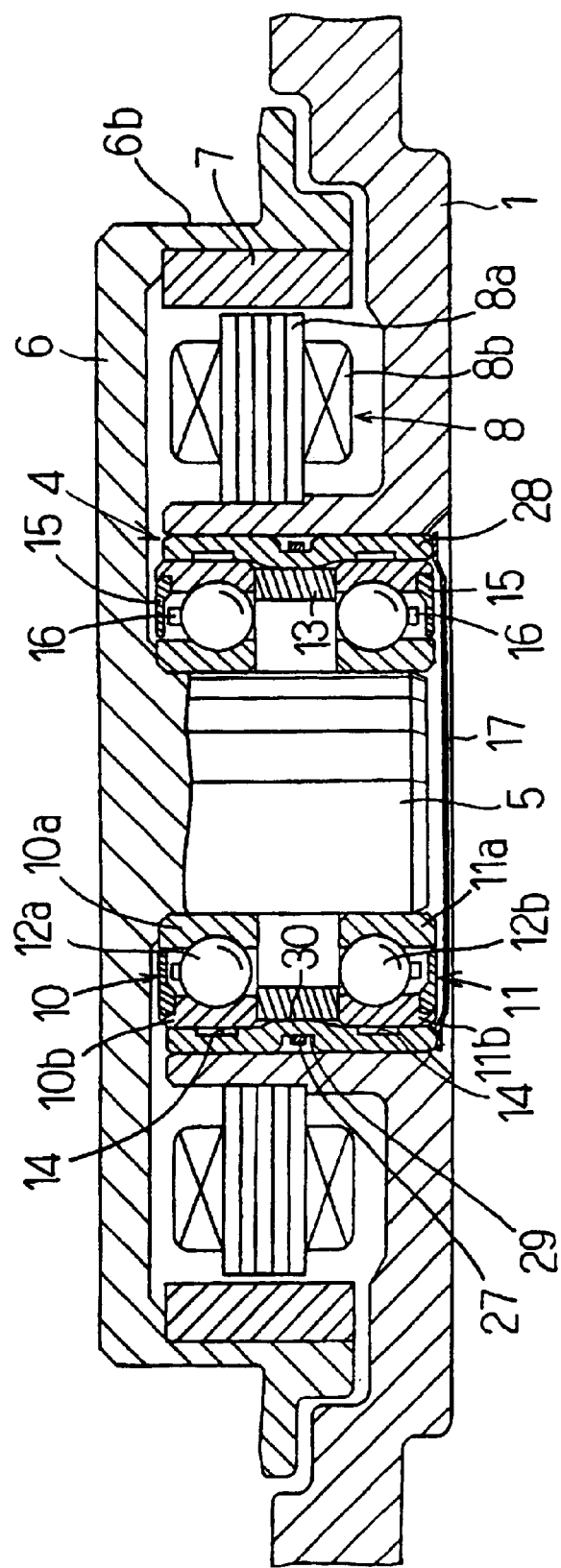
FIG. 8 is a vertical sectional view showing the spindle motor in accordance with the sixth embodiment of the present invention.

Although in the case of the spindle motor of the above-mentioned fifth embodiment, the shaft 5 and the rotor hub 6 are formed as separate members, these members may be formed integrally with each other by utilizing the same material as in the sixth embodiment as shown in FIG. 8.

In this sixth embodiment, the number of parts can be reduced in the same manner as in the second embodiment. Further, it is not necessary to assemble the shaft 5 with the rotor hub 6 upon assembling the spindle motor. In this connection, the adjustment process to be made during the assembling operation of the shaft with the rotor hub such as the centering process of the shaft is no longer required, and the number of steps required on assembling the motor can also be reduced.

The other structures or arrangements of the spindle motor of this sixth embodiment are identical with those of the fifth embodiment.

<The Seventh Embodiment>

Figure 9:
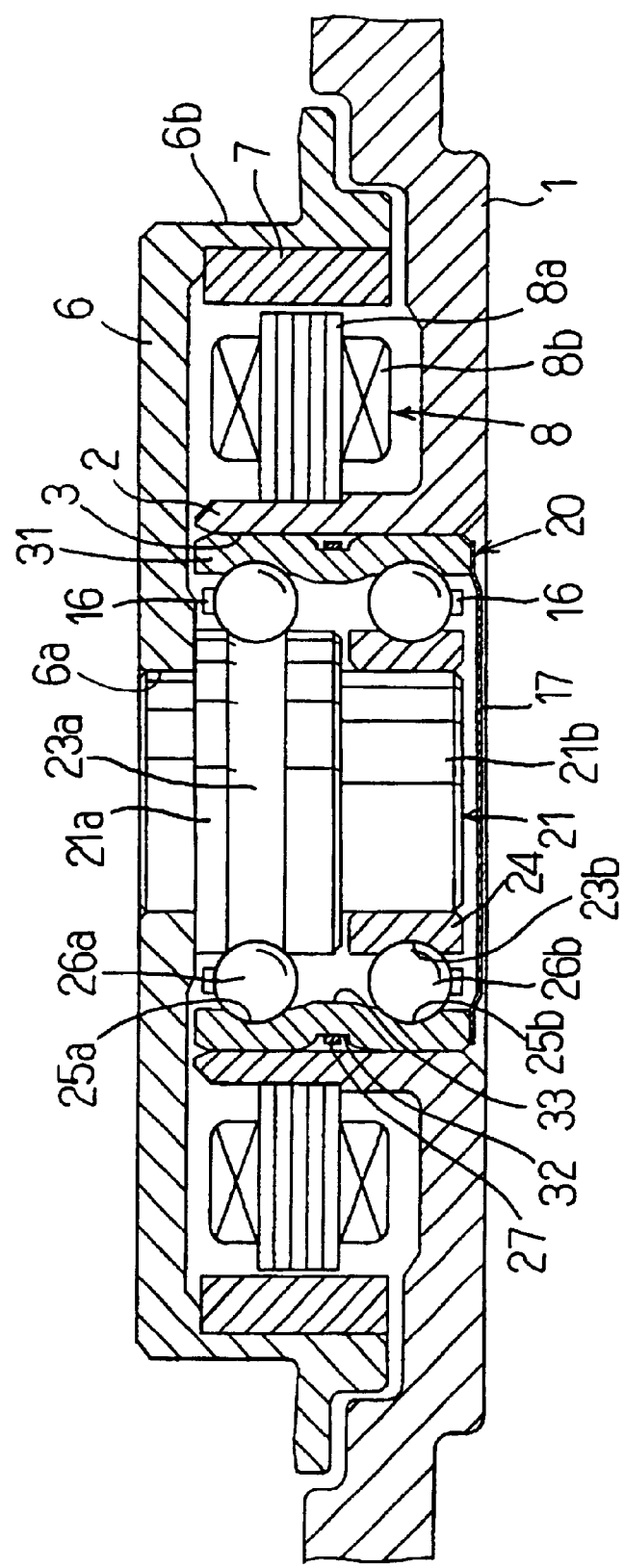
FIG. 9 is a vertical sectional view showing the spindle motor in accordance with the seventh embodiment of the present invention.

The spindle motor of the seventh embodiment shown in FIG. 9 includes a compound bearing device 20 of unique structure served as the bearing device for journaling the rotor hub 6 in the same manner as in the above mentioned third embodiment.

The compound bearing device 20 includes a stepped shaft 21 including a larger diameter shaft portion 21*a* and a reduced diameter shaft portion 21*b*, and a sleeve 31 for surrounding the stepped shaft. The larger diameter shaft portion 21*a* has an inner raceway 23*a* for the upper row formed directly around on its outer periphery. An inner ring 24 having an inner raceway 23*b* for the lower row is fit and secured around the reduced diameter shaft portion 21*b*.

The sleeve 31 has a pair of parallel outer raceways 25*a*, 25*b* formed directly on the inner peripheral surface thereof so that the sleeve 22 is served as an outer ring in common with both upper and lower bearings. Balls 26*a* are interposed between the outer raceway 25*a* of the upper row and the inner raceway 23*a* of the larger diameter shaft portion 21*a* of the stepped shaft, and balls 26*b* are interposed between the outer raceway 25*b* of the lower row of the sleeve 31 and the inner raceway 23*b* of the inner ring.

The balls 26*a*, 26*b* are formed for example of ceramic material and has the same diameter. This is because the outer diameter of the inner ring 24 is the same as that of the larger diameter shaft portion 21*a* of the stepped shaft.

The sleeve 31 has an outer peripheral groove 32 formed on its outer peripheral surface in the same manner as in the sleeve 28 of the above-mentioned fifth embodiment. A squeezing ring 27 formed for example of ceramic material is adapted to be press fit into the outer peripheral groove 32.

The outer peripheral groove 32 is formed on the sleeve at about the axially central portion between the outer raceways 25*a*, 25*b*. The depth of the outer peripheral groove is set so as to make the outer periphery of the squeezing ring 27 smaller than the outer diameter of the sleeve.

The sleeve 31 exhibits a straight cylindrical configuration before press fitting the squeezing ring 27 as in the fifth embodiment. Whereas after the squeezing ring is press fit into the groove, an inwardly protruding squeezed portion 33 is formed on the inner surface of the sleeve between the outer raceways 25*a*, 25*b*, and upper and lower portions of the sleeve 31 are drawn toward the squeezed portion 33 and thus the axial length of the sleeve 28 is reduced.

The inner diameter of the squeezing ring 27 is determined on the basis of the materials employed for the sleeve 31 and the bearing holder 2 and the threshold values of the increased temperature upon using. The amount of the deformation of the squeezed portion 33 formed on the sleeve 31 should be within the elastic limit of the material of the sleeve.

Also in the spindle motor of this seventh embodiment, the compound bearing device of the structure as mentioned above is employed as in the third embodiment, so that the generic bearing device including the inner and outer rings is no longer necessary. Further, the sleeve 31 is served as an outer ring in common with both upper and lower bearing device so that the number of parts can be reduced, the radial dimension of the larger diameter shaft portion 21*a* can be enlarged by the sum of the thicknesses of the inner and outer rings of the ball bearing, and the diameter of the reduced diameter shaft portion 21*b* can also be enlarged by the thickness of the outer ring of the ball bearing, i.e. the generally thick shaft can be obtained.

Accordingly, the stepped shaft of higher rigidity, good at durability, inhibited in its rotational run out, and good at quietness can be obtained.

The other structures or arrangements of the spindle motor of the seventh embodiment are identical with those of the fifth embodiment.

Even for the spindle motor of this seventh embodiment, each component of the motor will expand upon rising the temperature of the spindle motor through the operation thereof. The amount of expansion of the inner diameter of the sleeve 31 is larger than that of the outer diameter of the stepped shaft 21 and the inner ring 24, and the amount of expansion of the balls 26*a*, 26*b* is smaller than that of the stepped shaft and the inner ring, so that the pre-load to be applied to the balls is reduced, and the distance between the stepped shaft as well as the inner ring and the sleeve is enlarged.

On the other hand, upon rising the temperature, the inner diameter of the squeezing ring 27 is enlarged, the amount of urging pressure applied by the ring 27 on the sleeve 31 is decreased, the sleeve is tend to recover its original straight cylindrical shape by relieving the elastic deformation, the amount of protrusion of the squeezed portion 33 into the sleeve is reduced, the sleeve is elongated axially by the effect of expansion thereof, the distance between the upper and lower outer raceways 25*a*, 25*b* is enlarged, the spacing between the opposing inner and outer raceways of each ball bearing is reduced, and the pre-load to be applied on the balls are increased.

As can be seen from the above, the reduction of the pre-load applied on the balls by the effect of enlarging the distance between the stepped shaft as well as the inner ring and the sleeve might be cancelled by the augmentation of the pre-load applied on the balls by the effect of enlarging the distance between the upper and lower outer raceways. Thus an appropriate pre-load can be maintained even if the rising of the temperature is caused.

<The Eighth Embodiment>

Figure 10:
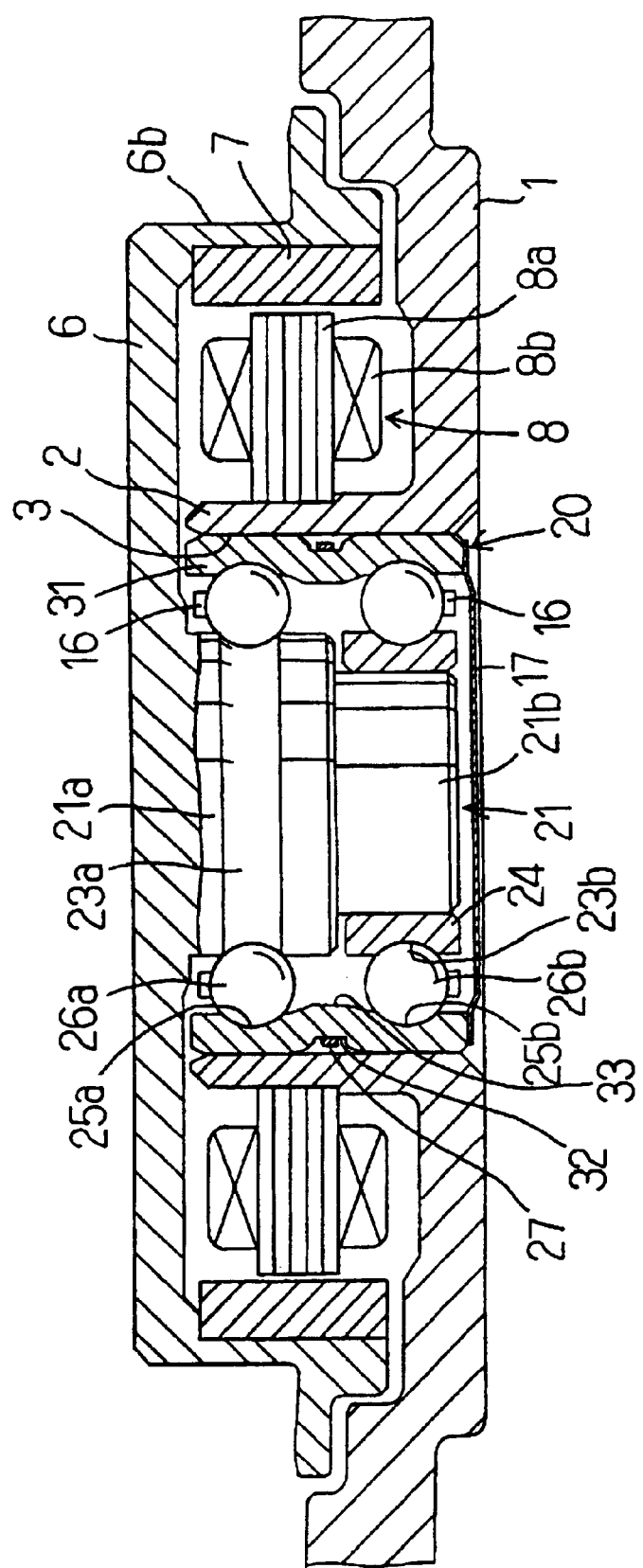
FIG. 10 is a vertical sectional view showing the spindle motor in accordance with the eighth embodiment of the present invention.
Figure 11:
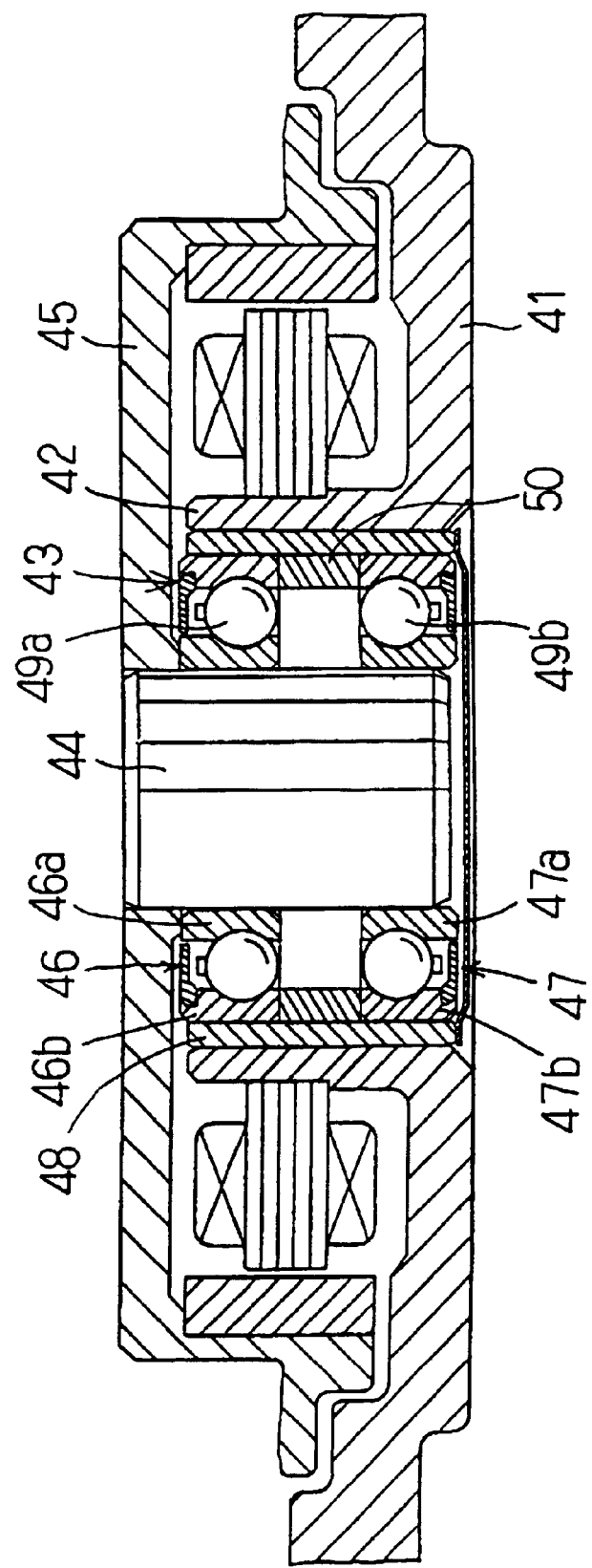
FIG. 11 is a vertical sectional view showing the spindle motor of the prior art.

Although in the case of the spindle motor of the above-mentioned seventh embodiment, the stepped shaft 21 and the rotor hub 6 are formed as separate members, these members may be formed integrally with each other by utilizing the same material as in the eighth embodiment as shown in FIG. 10.

In this eighth embodiment, the number of parts can be reduced in the same manner as in the fourth embodiment. Further, it is not necessary to assemble the shaft 21 with the rotor hub 6 upon assembling the spindle motor. In this connection, the adjustment process to be made during the assembling operation of the shaft with the rotor hub such as the centering process of the shaft is no longer required, and the number of steps required on assembling the motor can also be reduced.

The other structures or arrangements of the spindle motor of this eighth embodiment are identical with those of the seventh embodiment.

Although the balls of ceramic material are employed in the first to eighth embodiments for enhancing the durability thereof, balls of steel or other materials may also be used.

The Effects or Advantages of the Present Invention

The following advantages can be derived from the spindle motor of the above structure in accordance with the present invention.

The sleeve surrounding the outer ring or that served as an outer ring in common with both upper and lower bearing device is urged inwardly by the reduced inner diameter portion formed on the inner surface of the bore extending through the bearing holder or by the squeezing ring fit around the outer peripheral groove of the sleeve so as to form the squeezed portion. In this connection, upon rising the temperature by the operation of the motor, the spacing between the inner and outer raceways is increased by the effect of the thermal expansion of the component of the motor. This may be cancelled by increasing the spacing between upper and lower raceways by the thermal expansion of the sleeve and the force generated by the elastic recovery of the sleeve. In conclusion, the pressure applied on the balls by the contact with the inner and outer raceways or the pre-load on the balls can be maintained in a predetermined value.

Consequently, the spindle motor of the present invention can keep the rotational speed in high accuracy, can substantially prevent the natural frequency from varied, and can reduce the rotational run out and the noise accompanied therewith, even in the temperature thereof is increased.

In the embodiment of the spindle motor in which a bearing device includes a pair of upper and lower ball bearings and peripheral grooves are formed on the inner peripheral surface of the sleeve, the over pressure generated in the direction from the outer raceway of the outer ring toward the balls by the deformation of the sleeve or the rotor hub through the effect of the variation of the temperature will be dispersed by the peripheral grooves. Consequently, there are substantially no possibility to apply excessive load on the balls, or to deform the outer raceway of the outer ring. Thus the steady rotation with almost no run out can be retained.

The spindle motor of longer lifetime can be obtained by using balls of ceramic material. This is because the durability of the ceramic material is greater than the steel.

While particular embodiments of the present invention have been illustrated and described, it should be obvious to those skilled in the art that various changes and modifications can be made without departing from the spirit and scope of the invention.

What is claimed is:

1. A spindle motor comprising
   a double row bearing device including a shaft, a sleeve surrounding the shaft, and a pair of upper and lower rows of balls,
   a sylindrical bearing holder extending upwardly from a base of the spindle motor for accommodating the sleeve within a vertical bore of the holder, and
   a rotor hub mounted on the shaft for journaling the rotor hub rotatably on the base, the spindle motor is characterized in that
   an outer peripheral groove formed on the sleeve, and
   a squeezing ring having an inner diameter smaller than the outer diameter of the outer peripheral groove, wherein
   the squeezing ring is fit over the outer peripheral groove to elastically deform the sleeve inwardly to form a squeezed portion protruding inwardly between the upper and lower row of balls.

2. The spindle motor as claimed in claim 1 wherein the shaft and the rotor hub are formed integrally with each other by employing the same material.

3. The spindle motor as claimed in claim 1 wherein the balls are formed of ceramic material.

4. A spindle motor comprising
   a double row bearing device including a shaft, a sleeve surrounding the shaft, and a pair of upper and lower rows of ball bearings interposed between the shaft and the sleeve, each ball bearing has an inner ring and outer ring and balls interposed therebetween,
   a cylindrical bearing holder extending upwardly from a base of the spindle motor for accommodating the sleeve of the double row bearing device within a vertical bore of the holder, and
   a rotor hub mounted on the shaft for journaling the rotor hub rotatably on the base, the spindle motor is characterized in that
   an outer peripheral groove formed on the sleeve, and
   a squeezing ring having an inner diameter smaller than the outer diameter of the outer peripheral groove, wherein
   the squeezing ring is fit over the outer peripheral groove to elastically deform the sleeve inwardly to form a squeezed portion protruding inwardly between the upper and lower row of outer rings.

5. The spindle motor as claimed in claim 4 wherein peripheral grooves of substantially the same width as that of the outer raceway formed on the inner peripheral surface of the outer ring are formed at positions of the inner peripheral surface of the sleeve against which the outer ring of each ball bearing abut.

6. The spindle motor as claimed in claim 4 wherein the shaft and the rotor hub are formed integrally with each other by employing the same material.

7. The spindle motor as claimed in claim 4 wherein the balls are formed of ceramic material.

8. A spindle motor comprising
   a stepped shaft including a larger diameter shaft portion and a reduced diameter shaft portion,
   a compound bearing device including,
      a sleeve surrounding the stepped shaft and including a pair of upper and lower parallel outer raceways or grooves,
      balls of the upper row disposed between an inner raceway or groove formed directly on the outer periphery of the larger diameter shaft portion of the stepped shaft and the upper row of outer raceway formed on the inner peripheral surface of the sleeve, and
      balls of the lower row disposed between an inner raceway formed on an inner ring fit around the reduce diameter shaft portion of the stepped shaft and the lower row of outer raceway formed on the inner peripheral surface of the sleeve,
   a cylindrical bearing holder extending upwardly from a base of the spindle motor for accommodating the sleeve of the compound bearing device within a vertical bore of the holder, and
   a rotor hub mounted on the larger diameter shaft portion of the shaft for journaling the rotor hub rotatably on the base, the spindle motor is characterized in that
   an outer peripheral groove formed on the sleeve, and
   a squeezing ring having an inner diameter smaller than the outer diameter of the outer peripheral groove, wherein
   the squeezing ring is fit over the outer peripheral groove to elastically deform the sleeve inwardly to form a squeezed portion protruding inwardly to form a squeezed portion protruding inwardly between the upper and lower row of outer raceways.

9. The spindle motor as claimed in claim 8 wherein the shaft and the rotor hub are formed integrally with each other by employing the same material.

10. The spindle motor as claimed in claim 8 wherein the balls are formed of ceramic material.

11. The spindle motor as claimed in claim 8 wherein the outer diameter of the inner ring is identical with that of the larger diameter shaft portion of the stepped shaft, and the balls of the upper row are identical in their diameter with that of the balls of the lower row.

* * * * *